(12) United States Patent
Ikeda et al.

(10) Patent No.: US 9,595,707 B2
(45) Date of Patent: Mar. 14, 2017

(54) LITHIUM ION SECONDARY BATTERY

(71) Applicant: TDK CORPORATION, Tokyo (JP)

(72) Inventors: Yasuhiro Ikeda, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 699 days.

(21) Appl. No.: 13/846,266

(22) Filed: Mar. 18, 2013

(65) Prior Publication Data

US 2013/0260247 A1   Oct. 3, 2013

(30) Foreign Application Priority Data

Mar. 27, 2012  (JP) ................. 2012-070950
Mar. 13, 2013  (JP) ................. 2013-050349

(51) Int. Cl.

| | | |
|---|---|---|
| *H01M 4/134* | (2010.01) | |
| *H01M 4/131* | (2010.01) | |
| *H01M 4/36* | (2006.01) | |
| *H01M 4/38* | (2006.01) | |
| *H01M 4/485* | (2010.01) | |
| *H01M 4/525* | (2010.01) | |
| *H01M 10/052* | (2010.01) | |
| *H01M 4/505* | (2010.01) | |
| *H01M 4/62* | (2006.01) | |

(52) U.S. Cl.
CPC ......... *H01M 4/134* (2013.01); *H01M 4/131* (2013.01); *H01M 4/364* (2013.01); *H01M 4/386* (2013.01); *H01M 4/485* (2013.01); *H01M 4/525* (2013.01); *H01M 10/052* (2013.01); *H01M 4/366* (2013.01); *H01M 4/505* (2013.01); *H01M 4/625* (2013.01); *Y02E 60/122* (2013.01)

(58) Field of Classification Search
CPC ..................................................... H01M 4/134
See application file for complete search history.

(56) References Cited

U.S. PATENT DOCUMENTS

| | | | |
|---|---|---|---|
| 7,037,581 B2 * | 5/2006 | Aramata et al. | 428/402 |
| 8,003,253 B2 | 8/2011 | Sato et al. | |
| 8,105,718 B2 * | 1/2012 | Nakanishi et al. | 429/231.95 |
| 2006/0166098 A1 * | 7/2006 | Tabuchi et al. | 429/232 |
| 2006/0286458 A1 | 12/2006 | Sato et al. | |
| 2008/0113269 A1 * | 5/2008 | Yamamoto et al. | 429/231.4 |

(Continued)

FOREIGN PATENT DOCUMENTS

| | | |
|---|---|---|
| CN | 1866586 A | 11/2006 |
| CN | 102208635 A | 10/2011 |

(Continued)

*Primary Examiner* — Maria J Laios
(74) *Attorney, Agent, or Firm* — Oliff PLC

(57) ABSTRACT

A lithium ion secondary battery includes a positive electrode including a positive electrode active material having a composition represented by the formula (1)

$$Li_xNi_yCo_zM_tO_2 \qquad (1)$$

(wherein the element M is at least one kind selected from the group consisting of Mg, Ba, Al, Ti, Mn, V, Fe, Zr, and Mo and x, y, z, and t satisfy the following formulae: $0.9 \le x \le 1.2$, $0 \le y \le 1.1$, $0 \le z \le 1.1$, and $0 \le t \le 1.1$), and a negative electrode including a negative electrode active material mainly containing silicon and silicon oxide, and having an absorbance of 0.01 to 0.035 at $2110 \pm 10$ cm$^{-1}$ according to an FT-IR method.

6 Claims, 1 Drawing Sheet

(56) References Cited

U.S. PATENT DOCUMENTS

2010/0243951 A1\* 9/2010 Watanabe ............ H01M 4/485
252/182.1

FOREIGN PATENT DOCUMENTS

| JP | A-10-233237 | 9/1998 |
| JP | A-2004-146296 | 5/2004 |
| JP | A-2007-27084 | 2/2007 |
| JP | A-2007-258183 | 10/2007 |
| JP | A-2008-210618 | 9/2008 |

\* cited by examiner

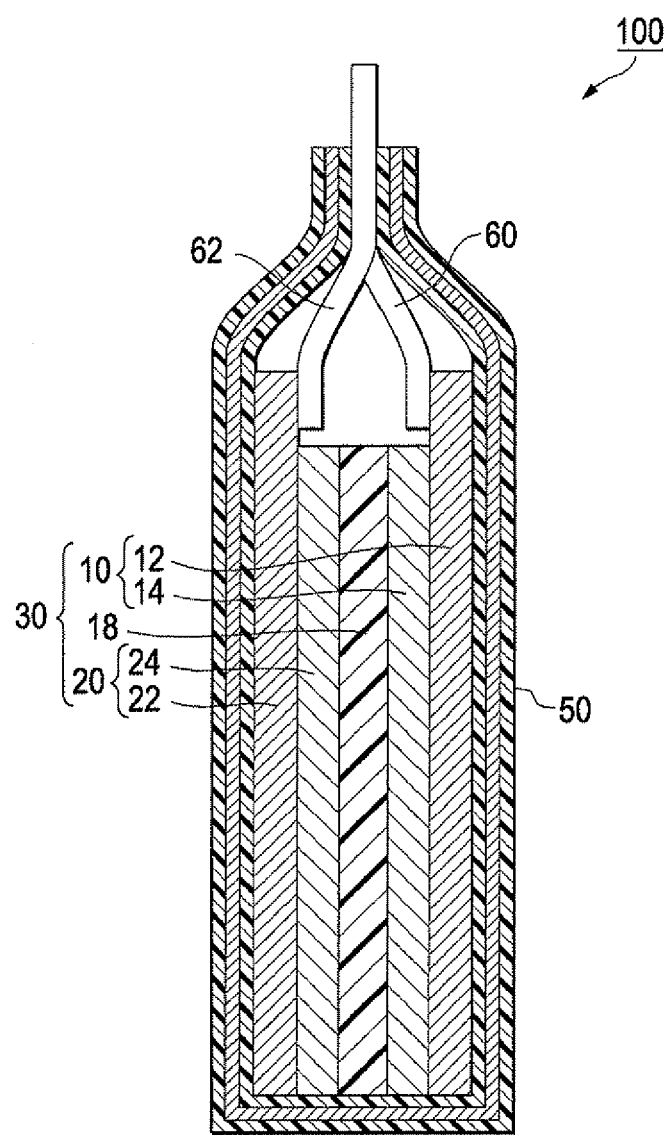

LITHIUM ION SECONDARY BATTERY

BACKGROUND

1. Technical Field

The present disclosure relates to a lithium ion secondary battery.

2. Related Art

Lithium ion secondary batteries are lighter in weight and higher in capacity than nickel-cadmium batteries, nickel-metal hydride batteries, and the like. The lithium ion secondary battery has been therefore widely used as a power source for a mobile electronic appliance. Further, as the mobile electronic appliances decrease in size and increase in functionality in recent years, the lithium ion secondary battery has been expected to have further higher capacity. Not just for the mobile electronic appliances, furthermore, the high-capacity lithium ion secondary battery has been a strong candidate as a power source to be mounted on a hybrid vehicle, an electric vehicle, or the like.

The increase in power storage amount per unit mass of a positive electrode and a negative electrode leads to the increase in energy density of a battery. As a positive electrode material that can increase the power storage amount, a so-called solid solution-based positive electrode has been examined. Above all, a layered oxide containing lithium is expected as a candidate of the positive electrode material with high capacity. The layered oxide containing lithium has an excellent cycle characteristic and can exhibit an electric capacity more than 200 mAh/g depending on the charging/discharging condition.

A positive electrode including the layered oxide containing lithium has high discharge capacity. However, in this positive electrode, oxygen is easily released from a positive electrode active material due to temperature rise when the deintercalation of Li out of the active material is caused by overcharging. This accelerates the oxidation reaction, which causes a problem that the temperature in the battery rises excessively.

For solving the above problem, for example, a battery according to JP-A-10-233237 includes an endothermic layer containing magnesium carbonate outside a positive electrode active material layer. In this configuration, when the battery is short-circuited, endothermic reaction occurs in which carbon dioxide is released, so that the battery is cooled.

Moreover, a battery according to JP-A-2004-146296 has lithium carbonate introduced inside the battery. Thus, lithium carbonate reacts with silicon oxide in a negative electrode in a process of heating due to short-circuiting current during the internal short-circuiting of the battery. As a result, carbon dioxide ($CO_2$) and lithium silicate are generated. The generated $CO_2$ fills the inside of the battery to reduce the oxygen partial pressure. Thus, excessive heat oxidation reaction is suppressed. As a result, the temperature rise of the battery is suppressed.

SUMMARY

A lithium ion secondary battery includes a positive electrode including a positive electrode active material having a composition represented by the following formula (1) and a negative electrode including a negative electrode active material mainly containing silicon and silicon oxide, and having an absorbance of 0.01 to 0.035 at $2110\pm10$ cm$^{-1}$ according to an FT-IR method:

$$Li_xNi_yCo_zM_tO_2 \tag{1}$$

wherein the element M is at least one kind selected from the group consisting of Mg, Ba, Al, Ti, Mn, V, Fe, Zr, and Mo and x, y, z, and t satisfy the following formulae: $0.9 \leq x \leq 1.2$, $0 \leq y \leq 1.1$, $0 \leq z \leq 1.1$, and $0 \leq t \leq 1.1$.

BRIEF DESCRIPTION OF DRAWING

FIG. 1 is a schematic cross-sectional view of a lithium ion secondary battery according to an embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the method according to JP-A-10-233237, carbon dioxide is not released reversibly. Therefore, the release of carbon dioxide to the inside of the battery keeps the battery internal pressure high, which makes the battery condition thereafter unstable. Thus, it cannot be said that this method is based on sufficient consideration on the reliability of the battery. Further, the method according to JP-A-2004-146296 can reduce the oxygen partial pressure but cannot reduce oxygen itself. Thus, it cannot be said that this method can sufficiently improve the reliability of the battery.

An object of the present disclosure is to provide a lithium ion secondary battery capable of having high capacity and suppressing temperature rise at overcharging.

A lithium ion secondary battery according to the present disclosure (present secondary battery) includes: a positive electrode including a positive electrode active material having a composition represented by the formula (1) below; and a negative electrode including a negative electrode active material mainly containing silicon and silicon oxide and having an absorbance of 0.01 to 0.035 at $2110\pm10$ cm$^{-1}$ obtained by an FT-IR method:

$$Li_xNi_yCo_zM_tO_2 \tag{1}$$

wherein the element M is at least one kind selected from the group consisting of Mg, Ba, Al, Ti, Mn, V, Fe, Zr, and Mo, and x, y, z, and t satisfy the following formulae: $0.9 \leq x \leq 1.2$, $0 \leq y \leq 1.1$, $0 \leq z \leq 1.1$, and $0 \leq t \leq 1.1$.

In the present secondary battery, the increase in oxygen generated in the battery is suppressed. As a result, oxidation reaction caused due to the increase in oxygen is suppressed. Therefore, the present secondary battery is a lithium ion secondary battery capable of having high capacity and suppressing the temperature rise at overcharging.

The negative electrode active material of the present secondary battery may be covered with amorphous carbon.

Thus, the present secondary battery can have higher capacity and further suppress the temperature rise at overcharging.

As thus described, the present secondary battery can have higher capacity and suppress the temperature rise at overcharging.

A preferred embodiment of the present disclosure is hereinafter described with reference to drawings. Note that the present disclosure is not limited to the following embodiment. Moreover, the components described below include components that can be easily conceived by those skilled in the art and components that are substantially the same as those components. Furthermore, the components described below can be combined with one another as appropriate.

FIG. 1 is a schematic cross-sectional view of a lithium ion secondary battery 100 according to this embodiment. As depicted in FIG. 1, the lithium ion secondary battery 100 mainly includes a laminate 30, a case 50, a pair of leads 60 and 62 connected to the laminate 30, and an electrolyte solution containing lithium ions. The case 50 houses the laminate 30 and the electrolyte solution in a sealed state.

The laminate 30 includes a positive electrode 10, a negative electrode 20 facing the positive electrode 10, and a separator 18. The separator 18 is held between the positive electrode 10 and the negative electrode 20 in contact with a main plane of the positive electrode 10 and a main plane of the negative electrode 20.

The positive electrode 10 includes a positive electrode current collector 12, and a positive electrode active material layer 14 formed on the positive electrode current collector 12. The negative electrode 20 includes a negative electrode current collector 22, and a negative electrode active material layer 24 formed on the negative electrode current collector 22. The separator 18 is disposed between the negative electrode active material layer 24 and the positive electrode active material layer 14.

The positive electrode active material layer 14 contains a positive electrode active material and a conductive auxiliary agent. The conductive auxiliary agent contains, for example, a carbon material such as carbon blacks, a powder of metal such as copper, nickel, stainless steel, or iron, a mixture of the carbon material and the powder of metal, or a conductive oxide such as ITO. The carbon material preferably contains carbon with a tap density of 0.03 to 0.09 g/ml and carbon with a tap density of 0.1 to 0.3 g/ml. The positive electrode active material layer 14 may contain a binder that binds the active material and the conductive auxiliary agent. The positive electrode active material layer 14 is formed through a step of applying a coating to the positive electrode current collector 12. Here, the coating includes the positive electrode active material, the binder, a solvent, and the conductive auxiliary agent.

The positive electrode active material according to this embodiment contains, for example, a composite metal oxide. The composite metal oxide may be a compound represented by $Li_xNi_yCo_zM_tO_2$ (wherein the element M is at least one kind selected from the group consisting of Mg, Ba, Al, Ti, Mn, V, Fe, Zr, and Mo, and x, y, z, and t satisfy the following formulae: $0.9 \leq x \leq 1.2$, $0 \leq y \leq 1.1$, $0 \leq z \leq 1.1$, and $0 \leq t \leq 1.1$). The positive electrode active material layer 14 including the positive electrode active material containing this composite metal oxide can have high discharge capacity. This composite metal oxide is more preferably $Li_xCo_zO_2$ ($0.9 \leq x \leq 1.2$ and $0.9 \leq z \leq 1.1$), and particularly preferably $Li_xNi_yCo_zMn_tO_2$ ($0.9 \leq x \leq 1.2$, $0 \leq y \leq 1.1$, $0 \leq z \leq 1.1$, and $0 \leq t \leq 1.1$). Further, this composite metal oxide is more particularly preferably $Li_xNi_yCo_zAl_tO_2$ ($0.9 \leq x \leq 1.2$, $0 \leq y \leq 1.1$, $0 \leq z \leq 1.1$, and $0 \leq t \leq 1.1$).

The negative electrode active material layer 24 contains a negative electrode active material and a conductive auxiliary agent. The negative electrode active material may be bound by a binder. In a manner similar to the positive electrode active material layer 14, the negative electrode active material layer 24 is formed through a step of applying a coating including the negative electrode active material and the like to the negative electrode current collector 22.

The negative electrode active material according to this embodiment mainly contains silicon and silicon oxide. This negative electrode active material has an absorbance of 0.01 to 0.035 at $2110 \pm 10$ $cm^{-1}$ obtained by the FT-IR method. As silicon oxide, for example, silicon monoxide (SiO) or silicon dioxide ($SiO_2$) can be used. The negative electrode active material may contain one kind of silicon oxide, or two or more kinds of silicon oxides. The absorbance at $2110 \pm 10$ $cm^{-1}$ obtained by the FT-IR method depends on the stretching vibration of Si—$H_2$. It is considered that the value of this absorbance indicates the degree of hydrogenation for terminating dangling bonds.

In this specification, the negative electrode active material mainly containing silicon and silicon oxide means a negative electrode active material in which the sum (mass ratio) of the mass of silicon and the mass of silicon oxide is 90 mass % or more with respect to the total mass of the negative electrode active material. From the viewpoint of achieving higher theoretical capacity, the mass ratio is preferably 95 mass % or more and more preferably 100 mass %.

Thus, in the negative electrode active material according to this embodiment, the absorbance is set at a predetermined value. This can increase the capacity of the lithium ion secondary battery 100 and can suppress the temperature rise of the lithium ion secondary battery 100 at overcharging. The mechanism is described below.

When the lithium ion secondary battery is in an overcharged state, oxygen is generated from the positive electrode active material at the charging and discharging time. This oxygen reacts with hydrogen at the silicon terminal on a surface of the negative electrode and changes into hydroxyl groups. This suppresses the increase in oxygen in the battery. Therefore, drastic oxidation reaction in the battery is suppressed. As a result, it is considered that the temperature rise of the lithium ion secondary battery at overcharging can be suppressed. If the negative electrode active material has an absorbance of less than 0.01 at $2110 \pm 10$ $cm^{-1}$, the terminated hydrogen on the surface of the negative electrode active material is insufficient. Thus, it becomes difficult to reduce the increase in oxygen, resulting in that the temperature rise is not suppressed sufficiently. If the absorbance is more than 0.035, the terminated hydrogen on the surface of the negative electrode active material suppresses the intercalation and deintercalation of lithium ions. As a result, the discharging characteristic of the battery is deteriorated.

The degree of hydrogenation of the terminal of the dangling bond on the surface of the negative electrode active material can be adjusted by, for example, exposing a powder of the negative electrode active material prepared in advance to hydrofluoric acid (HF). Through such a treatment, HF reacts with silicon on the surface of the negative electrode active material. As a result, the terminal of the dangling bond of silicon existing on the silicon surface turns into hydrogen. Alternatively, the hydrogenated terminal of the dangling bond on the surface of the negative electrode active material can be produced by using an electrolyte solution containing HF. The amount of HF in this electrolyte solution ranges from, for example, 10 to 30 ppm. Thus, silicon on the surface of the negative electrode active material is sufficiently reduced. In this manner, the absorbance can be adjusted as appropriate.

Moreover, silicon and silicon oxide in the negative electrode active material according to this embodiment are preferably thermally treated together with carbon. A carbon source includes, for example, a pitch-based compound such as mesophase pitch, bronze asphalt, or coal tar pitch, and carbon black such as acetylene black or Ketjen black. The carbon source preferably contains amorphous carbon, and more preferably contains carbon black.

The negative electrode active material is covered with carbon (preferably amorphous carbon) by thermally treating silicon and silicon oxide together with carbon. This can increase the electrical conductivity of the negative electrode active material. As a result, the discharge capacity of the lithium ion secondary battery can be increased. Moreover, a surface of silicon oxide is reduced, so that the amount of silicon on the surface is increased. Silicon on the surface of silicon oxide reacts with HF in the electrolyte solution. Consequently, the terminal of the dangling bond of silicon existing on the silicon surface turns into hydrogen.

The thermal treatment condition (temperature of thermal treatment) is preferably in the range of 250° C. to 800° C. from the viewpoint of sufficiently reducing the surface of silicon oxide. The atmosphere of the thermal treatment is preferably inert. The time of the thermal treatment is not particularly limited. The time of the thermal treatment is preferably in the range of 10 hours to 30 hours from the viewpoint of sufficiently reducing the surface of silicon oxide.

The absorbance of the negative electrode active material of this embodiment can be set to be in a predetermined range by appropriately adjusting the production condition such as the amount of HF in the electrolyte solution or the thermal treatment condition for the negative electrode active material.

The separator 18 may have an electrically insulating porous structure. The material of the separator 18 includes, for example, a single-layer body or a laminate including a film of polyethylene, polypropylene, or polyolefin, an extended film of a mixture including any of the above resins, and a fiber nonwoven fabric including at least one constituent selected from the group consisting of cellulose, polyester, and polypropylene.

The electrolyte solution may be, for example, a nonaqueous solvent (organic solvent) in which a lithium salt is dissolved. Examples of the lithium salt include $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of these salts may be used alone or in combination of two or more kinds thereof.

Examples of the preferable organic solvent include propylene carbonate, ethylene carbonate, diethyl carbonate, dimethyl carbonate, and methyl ethyl carbonate. Any of these may be used alone or in combination of two or more kinds thereof in arbitrary proportion. The organic solvent preferably includes a mixture of cyclic carbonate and chain carbonate. The organic solvent particularly preferably contains at least ethylene carbonate and diethyl carbonate from the viewpoint of the balance between discharge capacity and a cycle characteristic.

EXAMPLES

Hereinafter, the present disclosure is described more specifically with reference to examples and comparative examples. However, the present disclosure is not limited to the examples below.

Example 1

(Production of Positive Electrode)

An electrode was produced so as to contain 95 parts by mass of a positive electrode active material, $LiNi_{0.55}Co_{0.1}Al_{0.05}O_2$, 3 parts by mass of acetylene black, and 2 parts by mass of polyvinylidene difluoride (PVDF). This electrode was press-formed by roller pressing.

(Production of Negative Electrode Active Material)

Si and SiO were mixed at a ratio of Si/SiO=1/2 (weight ratio). Then, this mixture was crushed and mixed by a planetary ball mill. Alumina beads with a diameter of 3 mm were used as media of the planetary ball mill, the number of rotations of the planetary ball mill was set to 500 rpm, and the crushing and mixing time was set to 60 minutes. Consequently, a negative electrode active material was obtained.

(Production of Negative Electrode)

A slurry for a negative electrode active material layer was prepared by mixing 83 parts by mass of the negative electrode active material, 2 parts by mass of acetylene black, 15 parts by mass of polyamide-imide resin, and 82 parts by mass of N-methylpyrrolidone. This slurry was applied to the surface of a 14-μm-thick copper foil so that the amount of coating of the negative electrode active material was 2.0 mg/cm$^2$, and then dried at 100° C. to give the negative electrode active material layer. After that, the negative electrode (the copper foil to which the slurry has been applied) was press-formed by roller pressing to give the negative electrode in which the negative electrode active material layer had a thickness of 18 μm.

(Production of Lithium Ion Secondary Battery for Evaluation)

The positive electrode and the negative electrode, which were produced in the above manner, and a separator including a polyethylene porous film held between the electrodes were placed in an aluminum laminated package. Then, a $LiPF_6$ solution (solvent: ethylene carbonate/diethyl carbonate=3/7 (volume ratio)) with a concentration of 1 M (1 mol/L) was poured as the electrolyte solution into this aluminum laminated package. Moreover, 30 ppm of HF was poured into the electrolyte solution. After that, the package was sealed to vacuum. Consequently, a lithium ion secondary battery for evaluation according to Example 1 was obtained.

Examples 2 to 5

Lithium ion secondary batteries for evaluation according to Examples 2 to 5 were produced in a manner similar to Example 1 except that HF indicated in Table 1 was poured into the electrolyte solution.

Examples 6 to 15 and Comparative Examples 1 to 4

Lithium ion secondary batteries for evaluation according to Examples 6 to 15 and Comparative Examples 1 to 4 were produced in a manner similar to Example 1 except that 95 parts by mass of the negative electrode active material and the carbon source indicated in Table 1 were thermally treated together at the thermal treatment temperature indicated in Table 1 for 20 hours in a nitrogen atmosphere and that HF indicated in Table 1 was poured into the electrolyte solution.

Examples 16 to 20

Lithium ion secondary batteries for evaluation according to Examples 16 to 20 were produced in a manner similar to Example 1 except that $LiNi_{0.33}Co_{0.33}Mn_{0.33}O_2$ was used as the positive electrode active material and that HF indicated in Table 1 was poured into the electrolyte solution. The amount of coating of the positive electrode active material was determined so that the capacity of the positive electrode was equal to the capacity of the positive electrode according to Example 1.

Examples 21 to 30 and Comparative Examples 5 to 8

Lithium ion secondary batteries for evaluation according to Examples 21 to 30 and Comparative Examples 5 to 8 were produced in a manner similar to Example 1 except that $LiNi_{0.33}Co_{0.33}Mn_{0.33}O_2$ was used as the positive electrode active material, that 95 parts by mass of the negative electrode active material and the carbon source indicated in Table 1 were thermally treated together at the thermal treatment temperature indicated in Table 1 for 20 hours in a nitrogen atmosphere, and that HF indicated in Table 1 was poured into the electrolyte solution. The amount of coating of the positive electrode active material was determined so that the capacity of the positive electrode was equal to the capacity of the positive electrode according to Example 1.

Examples 31 to 35

Lithium ion secondary batteries for evaluation according to Examples 31 to 35 were produced in a manner similar to Example 1 except that $LiCoO_2$ was used as the positive electrode active material and that HF indicated in Table 1 was poured into the electrolyte solution. The amount of coating of the positive electrode active material was determined so that the capacity of the positive electrode was equal to the capacity of the positive electrode according to Example 1.

Examples 36 to 45 and Comparative Examples 9 to 12

Lithium ion secondary batteries for evaluation according to Examples 36 to 45 and Comparative Examples 9 to 12 were produced in a manner similar to Example 1 except that $LiCoO_2$ was used as the positive electrode active material, that 95 parts by mass of the negative electrode active material and the carbon source indicated in Table 1 were thermally treated together at the thermal treatment temperature indicated in Table 1 for 20 hours in a nitrogen atmosphere, and that HF indicated in Table 1 was poured into the electrolyte solution.

<Measurement of Discharge Capacity and Overcharging Test>

The battery capacity (discharge capacity) of the lithium ion secondary batteries for evaluation according to examples and comparative examples were calculated (measured). In this measurement, a secondary battery charging/discharging testing device was used to perform charging at constant current and constant voltage up to 4.2 V and discharging at constant current down to 2.5 V. The measurement results are shown in Table 1.

The batteries were charged for one hour at a constant current and a constant voltage up to 10 V with a current corresponding to 3 C relative to the battery capacity. The overcharging test was thus performed. The maximum temperature of the battery surface was measured and recorded. The measurement results are shown in Table 1.

<Measurement of Absorbance>

As for the negative electrode active materials of the batteries according to Examples 1 to 45 and Comparative Examples 1 to 12, the absorbance at $2110 \pm 10$ $cm^{-1}$ corresponding to the stretching vibration of $Si-H_2$ was measured by the FT-IR method. The measurement results are shown in Table 1.

TABLE 1

| | positive electrode active material | carbon source | thermal process temperature for negative electrode active material/° C. | absorbance | hydrofluoric acid volume/ppm | discharge capacity/mAh | maximum heat generation temperature/° C. |
|---|---|---|---|---|---|---|---|
| Example 1 | $LiNi_{0.85}Co_{0.1}Al_{0.05}O_2$ | — | 350 | 0.027 | 30 | 36.1 | 39 |
| Example 2 | $LiNi_{0.85}Co_{0.1}Al_{0.05}O_2$ | — | 350 | 0.024 | 25 | 35.9 | 42 |
| Example 3 | $LiNi_{0.85}Co_{0.1}Al_{0.05}O_2$ | — | 350 | 0.023 | 20 | 35.8 | 47 |
| Example 4 | $LiNi_{0.85}Co_{0.1}Al_{0.05}O_2$ | — | 350 | 0.019 | 15 | 35.5 | 51 |
| Example 5 | $LiNi_{0.85}Co_{0.1}Al_{0.05}O_2$ | — | 350 | 0.016 | 10 | 35.4 | 54 |
| Example 6 | $LiNi_{0.85}Co_{0.1}Al_{0.05}O_2$ | bronze asphalt | 800 | 0.035 | 30 | 38.2 | 34 |
| Example 7 | $LiNi_{0.85}Co_{0.1}Al_{0.05}O_2$ | acetylene black | 350 | 0.035 | 30 | 39.1 | 36 |
| Example 8 | $LiNi_{0.85}Co_{0.1}Al_{0.05}O_2$ | Ketjen black | 350 | 0.032 | 30 | 41.2 | 38 |
| Example 9 | $LiNi_{0.85}Co_{0.1}Al_{0.05}O_2$ | Ketjen black | 350 | 0.025 | 20 | 40.8 | 46 |
| Example 10 | $LiNi_{0.85}Co_{0.1}Al_{0.05}O_2$ | Ketjen black | 350 | 0.017 | 15 | 40.7 | 50 |
| Example 11 | $LiNi_{0.85}Co_{0.1}Al_{0.05}O_2$ | Ketjen black | 350 | 0.010 | 10 | 37.9 | 52 |
| Example 12 | $LiNi_{0.85}Co_{0.1}Al_{0.05}O_2$ | Ketjen black | 350 | 0.031 | 40 | 36.5 | 40 |
| Example 13 | $LiNi_{0.85}Co_{0.1}Al_{0.05}O_2$ | Ketjen black | 300 | 0.026 | 30 | 38.5 | 45 |
| Example 14 | $LiNi_{0.85}Co_{0.1}Al_{0.05}O_2$ | Ketjen black | 500 | 0.030 | 30 | 37.6 | 43 |
| Example 15 | $LiNi_{0.85}Co_{0.1}Al_{0.05}O_2$ | Ketjen black | 250 | 0.020 | 30 | 37.5 | 49 |
| Example 16 | $LiNi_{0.33}Co_{0.33}Mn_{0.33}O_2$ | — | 350 | 0.029 | 30 | 35.8 | 47 |
| Example 17 | $LiNi_{0.33}Co_{0.33}Mn_{0.33}O_2$ | — | 350 | 0.025 | 25 | 35.7 | 49 |
| Example 18 | $LiNi_{0.33}Co_{0.33}Mn_{0.33}O_2$ | — | 350 | 0.020 | 20 | 35.6 | 51 |
| Example 19 | $LiNi_{0.33}Co_{0.33}Mn_{0.33}O_2$ | — | 350 | 0.016 | 15 | 35.5 | 54 |
| Example 20 | $LiNi_{0.33}Co_{0.33}Mn_{0.33}O_2$ | — | 350 | 0.010 | 10 | 35.6 | 57 |
| Example 21 | $LiNi_{0.33}Co_{0.33}Mn_{0.33}O_2$ | bronze asphalt | 800 | 0.034 | 30 | 37.8 | 41 |
| Example 22 | $LiNi_{0.33}Co_{0.33}Mn_{0.33}O_2$ | acetylene black | 350 | 0.032 | 30 | 38.1 | 42 |
| Example 23 | $LiNi_{0.33}Co_{0.33}Mn_{0.33}O_2$ | Ketjen black | 350 | 0.030 | 30 | 40.3 | 45 |
| Example 24 | $LiNi_{0.33}Co_{0.33}Mn_{0.33}O_2$ | Ketjen black | 350 | 0.022 | 20 | 41.6 | 50 |
| Example 25 | $LiNi_{0.33}Co_{0.33}Mn_{0.33}O_2$ | Ketjen black | 350 | 0.018 | 15 | 39.8 | 53 |
| Example 26 | $LiNi_{0.33}Co_{0.33}Mn_{0.33}O_2$ | Ketjen black | 350 | 0.013 | 10 | 38.1 | 54 |

TABLE 1-continued

|  | positive electrode active material | carbon source | thermal process temperature for negative electrode active material/° C. | absorbance | hydrofluoric acid volume/ppm | discharge capacity/mAh | maximum heat generation temperature/° C. |
|---|---|---|---|---|---|---|---|
| Example 27 | LiNi$_{0.33}$Co$_{0.33}$Mn$_{0.33}$O$_2$ | Ketjen black | 350 | 0.035 | 40 | 39.2 | 41 |
| Example 28 | LiNi$_{0.33}$Co$_{0.33}$Mn$_{0.33}$O$_2$ | Ketjen black | 300 | 0.028 | 30 | 39.1 | 48 |
| Example 29 | LiNi$_{0.33}$Co$_{0.33}$Mn$_{0.33}$O$_2$ | Ketjen black | 500 | 0.031 | 30 | 36.8 | 44 |
| Example 30 | LiNi$_{0.33}$Co$_{0.33}$Mn$_{0.33}$O$_2$ | Ketjen black | 250 | 0.023 | 30 | 39.9 | 50 |
| Example 31 | LiCoO$_2$ | — | 350 | 0.028 | 30 | 35.5 | 49 |
| Example 32 | LiCoO$_2$ | — | 350 | 0.025 | 25 | 35.8 | 52 |
| Example 33 | LiCoO$_2$ | — | 350 | 0.023 | 20 | 35.7 | 53 |
| Example 34 | LiCoO$_2$ | — | 350 | 0.014 | 15 | 35.6 | 57 |
| Example 35 | LiCoO$_2$ | — | 350 | 0.010 | 10 | 35.3 | 59 |
| Example 36 | LiCoO$_2$ | bronze asphalt | 800 | 0.034 | 30 | 38.1 | 45 |
| Example 37 | LiCoO$_2$ | acetylene black | 350 | 0.034 | 30 | 38.1 | 44 |
| Example 38 | LiCoO$_2$ | Ketjen black | 350 | 0.032 | 30 | 40.2 | 47 |
| Example 39 | LiCoO$_2$ | Ketjen black | 350 | 0.026 | 20 | 40.9 | 51 |
| Example 40 | LiCoO$_2$ | Ketjen black | 350 | 0.018 | 15 | 39.9 | 54 |
| Example 41 | LiCoO$_2$ | Ketjen black | 350 | 0.011 | 10 | 38.3 | 58 |
| Example 42 | LiCoO$_2$ | Ketjen black | 350 | 0.035 | 40 | 37.2 | 44 |
| Example 43 | LiCoO$_2$ | Ketjen black | 300 | 0.024 | 30 | 36.9 | 52 |
| Example 44 | LiCoO$_2$ | Ketjen black | 500 | 0.033 | 30 | 37.0 | 46 |
| Example 45 | LiCoO$_2$ | Ketjen black | 250 | 0.020 | 30 | 37.6 | 53 |
| Comparative Example 1 | LiNi$_{0.85}$Co$_{0.1}$Al$_{0.05}$O$_2$ | Ketjen black | 350 | 0.045 | 50 | 28.3 | 41 |
| Comparative Example 2 | LiNi$_{0.85}$Co$_{0.1}$Al$_{0.05}$O$_2$ | Ketjen black | 350 | 0.005 | 5 | 37.3 | 73 |
| Comparative Example 3 | LiNi$_{0.85}$Co$_{0.1}$Al$_{0.05}$O$_2$ | Ketjen black | 1000 | 0.043 | 30 | 27.8 | 44 |
| Comparative Example 4 | LiNi$_{0.85}$Co$_{0.1}$Al$_{0.05}$O$_2$ | Ketjen black | 150 | 0.004 | 30 | 31.2 | 72 |
| Comparative Example 5 | LiNi$_{0.33}$Co$_{0.33}$Mn$_{0.33}$O$_2$ | Ketjen black | 350 | 0.043 | 50 | 28.3 | 31 |
| Comparative Example 6 | LiNi$_{0.33}$Co$_{0.33}$Mn$_{0.33}$O$_2$ | Ketjen black | 350 | 0.004 | 5 | 37.3 | 74 |
| Comparative Example 7 | LiNi$_{0.33}$Co$_{0.33}$Mn$_{0.33}$O$_2$ | Ketjen black | 1000 | 0.042 | 30 | 27.8 | 32 |
| Comparative Example 8 | LiNi$_{0.33}$Co$_{0.33}$Mn$_{0.33}$O$_2$ | Ketjen black | 150 | 0.006 | 30 | 31.2 | 73 |
| Comparative Example 9 | LiCoO$_2$ | Ketjen black | 350 | 0.044 | 50 | 21.1 | 34 |
| Comparative Example 10 | LiCoO$_2$ | Ketjen black | 350 | 0.006 | 5 | 36.3 | 77 |
| Comparative Example 11 | LiCoO$_2$ | Ketjen black | 1000 | 0.042 | 30 | 19.9 | 35 |
| Comparative Example 12 | LiCoO$_2$ | Ketjen black | 150 | 0.005 | 30 | 36.4 | 75 |

As Table 1 shows, the batteries according to Examples 1 to 45 exhibit high discharge capacity and low maximum heat-generation temperature.

As for the batteries according to Comparative Examples 1 to 12, when the thermal treatment temperature was too high, the decrease in discharge capacity was observed. Meanwhile, when the thermal treatment temperature was too low, the decrease in discharge capacity and the increase in heat-generation temperature at overcharging were observed. When the amount of HF in the electrolyte solution was too large, the decrease in discharge capacity was observed. When the amount of HF in the electrolyte solution was too small, the maximum heat-generation temperature became high.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
a positive electrode including a positive electrode active material having a composition represented by formula (1) below; and
a negative electrode including a negative electrode active material mainly containing silicon and silicon oxide, and having an absorbance of 0.01 to 0.035 at 2110±10 cm$^{-1}$ according to an FT-IR method:

$$Li_xNi_yCo_zM_tO_2 \quad (1)$$

wherein;
M is at least one element selected from the group consisting of Mg, Ba, Al, Ti, Mn, V, Fe, Zr, and Mo; and
x, y, z, and t satisfy the following formulae:
$0.9 \leq x \leq 1.2$,
$0 \leq y \leq 1.1$,
$0 \leq z \leq 1.1$, and
$0 \leq t \leq 1.1$.

2. The lithium ion secondary battery according to claim 1, wherein:
$y=0$;
$0.0 \leq z \leq 1.1$; and
$t=0$.

3. The lithium ion secondary battery according to claim 1, wherein the M is Mn.

4. The lithium ion secondary battery according to claim 1, wherein the M is Al.

5. The lithium ion secondary battery according to claim 1, wherein a ratio of the total mass of the negative electrode active material to a sum of the mass of silicon and the mass of silicon oxide is 95 mass % or more.

6. The lithium ion secondary battery according to claim 1, wherein the negative electrode active material is covered with amorphous carbon.

* * * * *